L. H. COBB.
TRANSMISSION GEARING FOR MOTOR CYCLES.
APPLICATION FILED JULY 26, 1913.
1,180,697.
Patented Apr. 25, 1916.
2 SHEETS—SHEET 1.
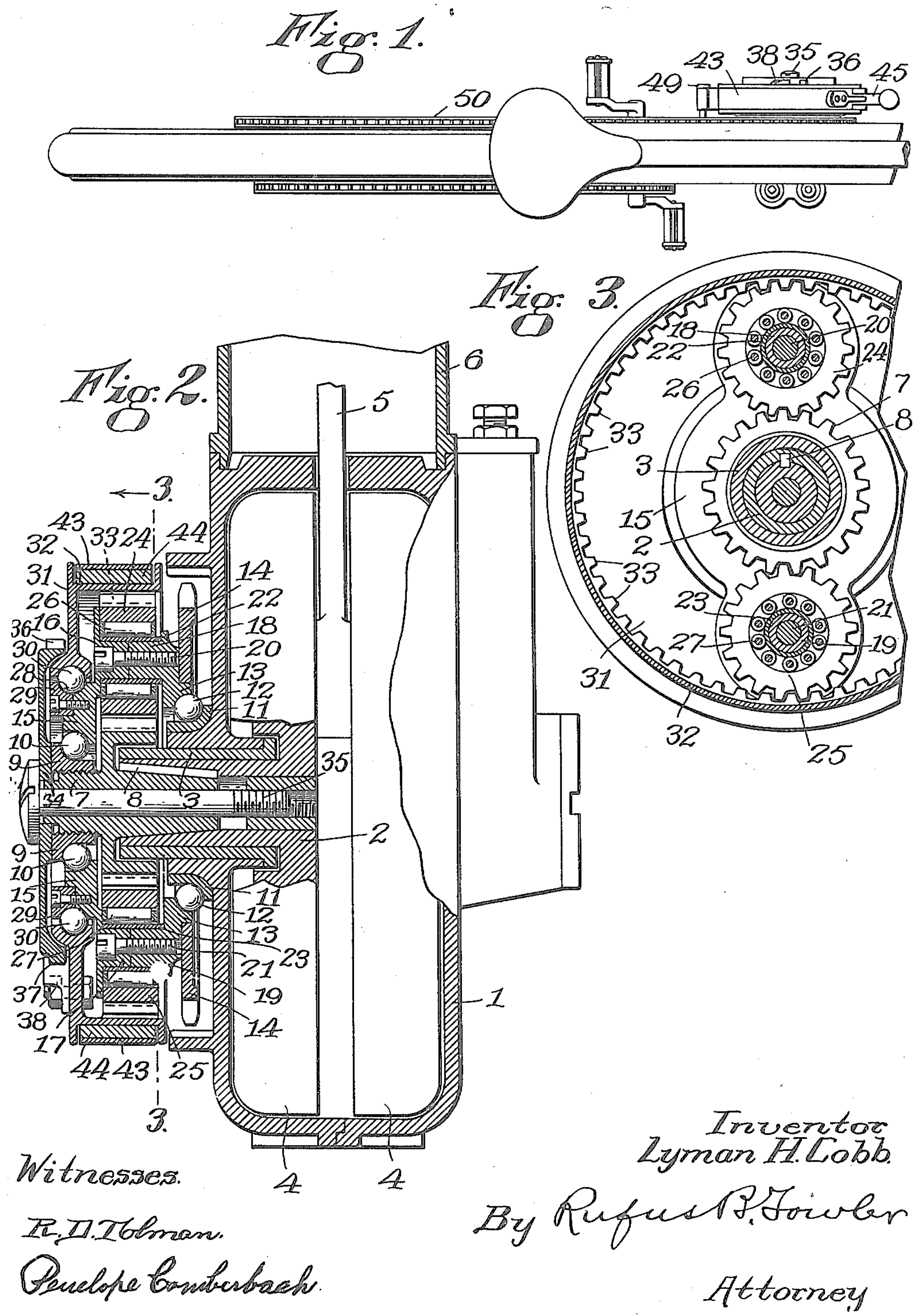
Witnesses.
R. D. Tolman.
Penelope Comberbach.
Inventor
Lyman H. Cobb.
By Rufus B. Fowler
Attorney L. H. COBB.
TRANSMISSION GEARING FOR MOTOR CYCLES.
APPLICATION FILED JULY 26, 1913.
1,180,697.
Patented Apr. 25, 1916.
2 SHEETS—SHEET 2.
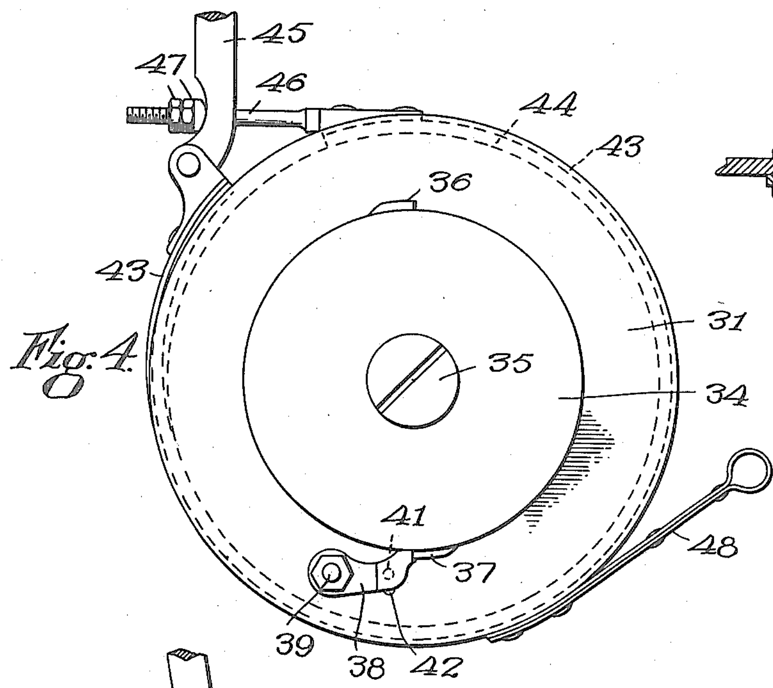
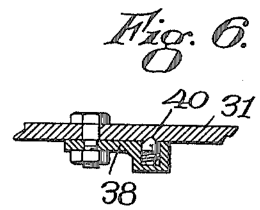
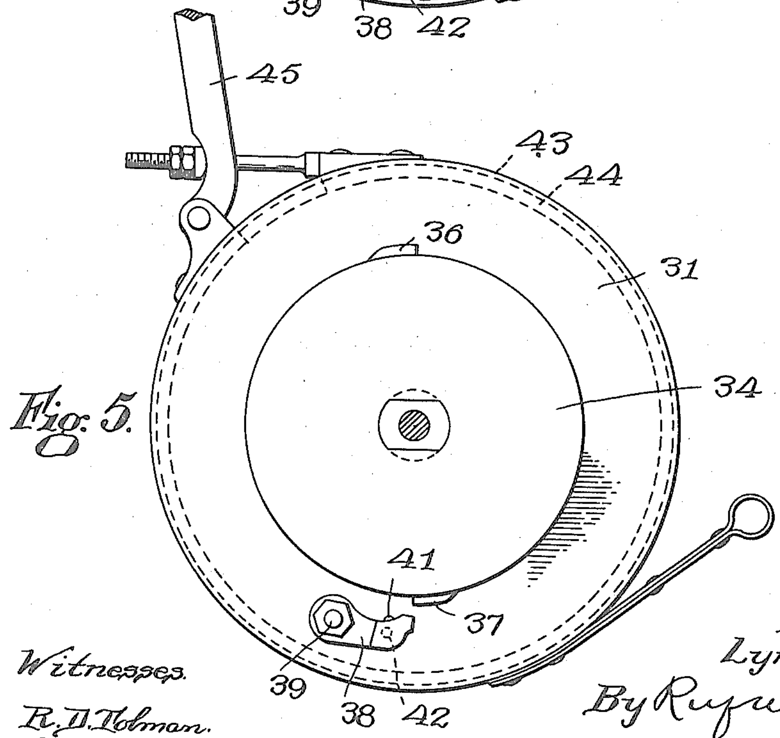
Witnesses.
R. D. Tolman.
Penelope Comberbach
Inventor
Lyman H. Cobb.
By Rufus B. Fowler
Attorney.

UNITED STATES PATENT OFFICE.

LYMAN H. COBB, OF FITCHBURG, MASSACHUSETTS, ASSIGNOR TO MARY ELIZABETH JOHNSON, TRUSTEE UNDER THE WILL OF IVER JOHNSON, OF FITCHBURG, MASSACHUSETTS.

TRANSMISSION-GEARING FOR MOTOR-CYCLES.

1,180,697. Specification of Letters Patent. Patented Apr. 25, 1916.

Application filed July 26, 1913. Serial No. 781,379.

*To all whom it may concern:*

Be it known that I, LYMAN H. COBB, a citizen of the United States, residing at Fitchburg, in the county of Worcester and Commonwealth of Massachusetts, have invented a new and useful Improvement in Transmission-Gearing for Motor-Cycles, of which the following, together with the accompanying drawings, is a specification.

My invention relates to transmission gearing for motorcycles and more particularly to an improved form of transmission gearing peculiarly adapted to facilitate the turning of the pedals by the rider while the motor is being started.

In order that the gasolene motor of a motorcycle may operate efficiently, the main driving shaft of the motor must rotate with considerable speed, its speed usually being at least several times that at which the main driving sprocket preferably rotates. For this reason it is customary to provide some form of reducing gearing between the main driving shaft and the main driving sprocket. To start the motor, it is necessary to drive it from some outside source until it has attained sufficient speed to cause the ignition system to explode properly the fuel within the cylinder or cylinders. This preliminary driving of the motor is ordinarily effected by the rider, either by turning the pedals or by running the machine along the ground. The speed of the motor being several times that of the main driving sprocket, however, it is necessary to apply considerable force to the driving sprocket in order to drive the motor at its greater speed.

The main object of the invention is to overcome this objection by providing a driving gearing so constructed that the normal ratio between the speed of the motor and that of the driving sprocket may be reduced while the motor is being started and restored again after the motor has been started.

Another object of the invention is to construct the driving gearing so that the normal ratio between the speed of the motor and that of the driving sprocket shall be automatically restored as soon as the motor has been started.

Other objects and advantages will appear from the following description taken in connection with the accompanying drawings, in which—

Figure 1 is a plan view of the rear portion of a motorcycle equipped with a driving gearing constructed in accordance with my invention; Fig. 2 is a vertical sectional view through the axis of the main driving shaft of the motor; Fig. 3 is a sectional view on the plane of the line 3—3 of Fig. 2; Fig. 4 is an elevation of the gear case with the parts properly adjusted to allow the motor to be started easily by turning the pedals or by running the machine along the ground; Fig. 5 is a view similar to that shown in Fig. 4, but with the parts properly adjusted for the normal driving of the machine by the motor; and Fig. 6 is a detail sectional view of the pawl shown in Figs. 1, 2, 4 and 5.

Like reference characters refer to similar parts in the different figures.

In the form of the invention shown in the drawings the crank case 1 includes a hollow main driving shaft 2 turning in a bearing 3 supported by the crank case, the driving shaft carrying a pair of fly-wheels 4 and driven by a connecting rod 5 extending upwardly into the cylinder 6 of a gasolene motor. The outer end of the opening in the driving shaft 2 is tapered to receive the inner conical end of the hub of a gear wheel 7, the gear wheel and shaft being keyed together with a key 8. A cone 9, threaded onto the outer end of the hub of the gear wheel 7, supports a set of balls 10 and a second cone 11, mounted on the outer face of the crank case 1 and concentrically with the axis of the driving shaft 2, supports a second set of balls 12. A cup 13 carrying the main driving sprocket 14 turns upon the set of balls 12. An annular member 15 with a ball race at its inner edge turns upon the set of balls 10. The member 15 is formed with a pair of integral cylindrical projections 16 and 17, and the cup 13 is formed with a similar pair of integral cylindrical projections 18 and 19 in alinement with the projections 16 and 17 and extending into contact therewith. The member 15 and the cup 13 are secured rigidly together by a pair of machine screws 20 and 21 extending through the axes of the projections, as shown in Fig. 2. The projections 16, 17, 18 and 19 serve not only to space the member 15 and the cup 13, but also to form supports for the sleeves 22 and 23. These sleeves serve as bearings to support the pinions 24 and 25, the sets of rollers 26 and 27 being interposed between the sleeves and the bearing surfaces of the sleeves and pinions to reduce friction. The pinions 24 and 25 are on directly opposite sides of the driving shaft 2 and are each in mesh with teeth on diametrically opposite sides of the gear wheel 7. The member 15 has a portion of a ball race 28 formed in its outer face, this ball race being completed by a second portion thereof formed in the periphery of a ring 29 rigidly secured to the member 15. A set of balls 30 in the ball race 28 support an annular plate 31. The plate 31 is provided with a cylindrical flange 32 having internal gear teeth 33 in mesh with those teeth of both the pinions 24 and 25 which are farthest from the driving shaft 2.

The construction so far described includes a planetary gearing comprising the central gear wheel 7, the internally geared flange 32 and the pair of interposed planetary gears or pinions 24 and 25. The outer end of the hub of the gear wheel 7 fits into a central opening in a plate 34, opposite sides of the end of the hub being flattened to prevent relative rotation between the hub and plate. A screw 35 threaded into the opening in the center of the driving shaft 2 draws the plate 34 firmly against the cone 9 so as to prevent separation of the cone 9 and gear wheel 7 from the driving shaft 2. The plate 34 has a pair of projections or teeth 36 and 37 diametrically disposed upon its periphery, these projections lying close to the outer face of the plate 31. A pawl 38 is secured by a bolt 39 to the outer face of the plate 31 so as to swing into and out of the path of the projections 36 and 37. The free end of the pawl 38 surrounds a pin 40 which is spring pressed toward the plate 31 to engage one or the other of a pair of depressions 41 and 42 so as to hold the pawl yieldably either in or out of the path of the projections 36 and 37.

A brake band 43 lined with any suitable material, such as a strip of leather 44, surrounds the flange 32 and may be caused to grip the flange or release it by means of a lever 45 extending upwardly within reach of the rider of the machine. Means comprising the threaded rod 46 and the nuts 47 are provided for adjusting the location of the path of the lever 45. A tie 48 connects the lower portion of the brake band 43 with a fixed post 49 to prevent rotation of the brake band about the flange 32.

To start a motor equipped with the transmission gearing which has been described, the pawl 38 is first pressed toward the plate 34 so that its free end will lie in the path of the projections 36 and 37 and the lever 45 is moved rearwardly to release the brake band 43 from the flange 32. The rider may then mount the machine and turn the pedals or he may run the machine along the ground, the rear wheel in either case driving the main or motor sprocket 14 by means of the driving chain 50. While a chain and sprocket wheel connection is shown between the driving gear and the rear or driving wheel of the machine, any other suitable form of connection may, of course, be substituted, such as a belt and grooved pulleys or wheels. The sprocket 14 and the pinions 24 and 25 are both carried by the cup 13 so that these pinions are rotated about the driving shaft 2 with the sprocket 14 and at the same speed as that at which the sprocket rotates. If it were not for the pawl 38, the pinions 24 and 25 would merely roll about the gear wheel 7 and cause the flange 32 to rotate in the same direction with them, but at greater angular velocity. The pawl 38, however, serves to lock the flange 32 to the gear wheel 7 so as to prevent this relative rotation and so as to compel both to rotate about the axis of the gear wheel 7 with the pinions and at the same speed as that at which the pinions move. It follows that, as the gear wheel 7 is keyed to the main driving shaft 2, the driving shaft and, therefore, the motor are caused to be driven. For the reason that the gear wheel 7 is rotating only as fast as is the motor sprocket, the force necessary to drive the sprocket is not nearly so great as where the speed of the motor is several times that of the motor sprocket. The rider is then enabled to start his motor much more easily, or to start it just as easily while ascending a considerably steeper incline. After the motor has attained sufficient speed to cause the ignition system to properly explode the fuel, the motor will, of course, start independently and with considerably increased speed and the plate 34 with its projections 36 and 37 will, of course, be rotated at this increased speed as they are directly driven by the main driving shaft 2. Inertia and friction will, however, hold back the pinions 24 and 25 and the flange 32, and the relative rotation between the plate 34 and the flange 32 will cause one of the projections 36 and 37 to pass under the pawl 38 so as to force it outwardly into its inoperative position out of the path of the projections, as shown in Fig. 5. The lever 45 is then moved forwardly to cause the brake band 43 to grip the flange 32 and prevent further rotation thereof, the motor, through the gear wheel 7, then serving to roll the pinions 24 and 25 along the internal teeth of the flange 32 so as to drive the motor sprocket 14 at the same speed at which they revolve about their common axis. The normal ratio of speed between the motor and the motor sprocket has now been restored so that the efficiency of the motor is at its maximum.

While I have shown and described the details of one form of my invention, I do not wish to be limited to such details as changes may be made without departing from the spirit of the invention; but Having described my invention, what I claim as new and desire to secure by Letters Patent is:

1. In a motorcycle, a wheel, a motor, means for establishing and disestablishing a predetermined driving ratio between said parts, in the operation of the motor as a driving member, means for establishing a different driving ratio between said parts in the operation of said wheel as a driving member to start said motor, and means for disconnecting the motor from said wheel after the motor has thus been started.

2. In a motorcycle, a wheel, a driving motor therefor, a gearing connection between said motor and wheel adapted to be established and disestablished by the operator, and means for directly connecting said motor and wheel, in the operation of said wheel as a driving member, to start said motor, said means being operable upon the disestablishment of said gearing connection between said parts.

3. In a motorcycle, a wheel, a motor for driving the same at a speed definitely related to the speed of the motor, means under the control of the operator for disconnecting said wheel and motor, and means, movable into operative position by the operator for establishing an independent driving ratio between said parts, in the operation of the wheel as a driving member to start said motor, when the first mentioned driving relation between them has been disconnected.

4. In a motorcycle, a planetary gearing including a center gear wheel, an internal gear surrounding the center gear wheel, and a plurality of planetary pinions interposed between the center gear wheel and the internal gear, a motor connected with the center gear wheel for normally driving it, a wheel connected with the planetary pinions and driven thereby for propelling the motorcycle, means for preventing rotation of the internal gear at will, and means for preventing relative rotation in one direction between the center gear wheel and the internal gear at will.

5. In a motorcycle, a planetary gearing including a center gear wheel, an internal gear surrounding the center gear wheel, and a plurality of planetary pinions interposed between the center gear wheel and the internal gear, a motor connected with the center gear wheel for normally driving it, a wheel connected with the planetary pinions and driven thereby for propelling the motorcycle, means for preventing rotation of the internal gear at will, means for preventing relative rotation in one direction between the center gear wheel and the internal gear, and means driven by the motor for rendering the last mentioned means inoperative after the motor has been started.

6. In a motorcycle, a planetary gearing including a center gear wheel, an internal gear surrounding the center gear wheel, and a plurality of planetary pinions interposed between the center gear wheel and the internal gear, a motor connected to the center gear wheel for driving it, a wheel connected to the planetary pinions for propelling the motorcycle, a plate having a projection connected to the motor to be driven thereby, a pawl connected to the internal gear for engagement with the projection on the plate, and a brake band for preventing rotation of the internal gear at will.

7. In a motorcycle, a planetary gearing including a center gear wheel, an internal gear surrounding the center gear wheel, and a plurality of planetary pinions interposed between the center gear wheel and the internal gear, a motor connected to the center gear wheel for driving it, a wheel connected to the planetary pinions for propelling the motorcycle, a plate having a projection connected to the motor to be driven thereby, a pawl connected to the internal gear for engagement with the projection to prevent rotation of the internal gear in one direction relatively to the plate, the pawl being arranged to be moved out of the path of the projection by a projection on the plate when the plate is rotated in the other direction faster than the internal gear, and a brake band to prevent rotation of the internal gear at will.

Dated this 21st day of July 1913.

LYMAN H. COBB.

Witnesses:
PENELOPE COMBERBACH,
R. E. ATHERTON.